US009369297B2

(12) United States Patent
Wijnands et al.

(10) Patent No.: US 9,369,297 B2
(45) Date of Patent: *Jun. 14, 2016

(54) PREVENTING TRAFFIC FLOODING TO THE ROOT OF A MULTI-POINT TO MULTI-POINT LABEL-SWITCHED PATH TREE WITH NO RECEIVERS

(71) Applicant: Cisco Technology, Inc., San Jose, CA (US)

(72) Inventors: Ijsbrand Wijnands, Leuven (BE); Arjen Boers, Sitges (ES)

(73) Assignee: CISCO TECHNOLOGY, INC., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/341,536

(22) Filed: Jul. 25, 2014

(65) Prior Publication Data

US 2014/0334308 A1 Nov. 13, 2014

Related U.S. Application Data

(63) Continuation of application No. 12/108,197, filed on Apr. 23, 2008, now Pat. No. 8,804,718.

(51) Int. Cl.
| | | |
|---|---|---|
| *H04L 12/18* | (2006.01) | |
| *H04L 12/751* | (2013.01) | |
| *H04L 12/761* | (2013.01) | |
| *H04L 12/753* | (2013.01) | |
| *H04L 12/723* | (2013.01) | |

(52) U.S. Cl.
CPC .......... *H04L 12/1886* (2013.01); *H04L 45/02* (2013.01); *H04L 45/16* (2013.01); *H04L 45/48* (2013.01); *H04L 45/50* (2013.01)

(58) Field of Classification Search
CPC ... H04L 12/185; H04L 12/1886; H04L 45/02; H04L 45/16; H04L 45/48; H04L 45/50
See application file for complete search history.

(56) References Cited

U.S. PATENT DOCUMENTS

| | | |
|---|---|---|
| 6,466,985 B1 | 10/2002 | Goyal et al. |
| 6,661,789 B1 | 12/2003 | Cankaya et al. |

(Continued)

OTHER PUBLICATIONS

Wijnands et al., Multicast Extensions for LDP, Mar. 2005, IETF, pp. 1-13.

(Continued)

*Primary Examiner* — Un C Cho
*Assistant Examiner* — Jeremy Costin
(74) *Attorney, Agent, or Firm* — Polsinelli PC

(57) ABSTRACT

A method is provided for pruning an MP2MP tree. The method includes, in a first node of an MP2MP LSP tree, determining whether the first node has only a single replication branch for the MP2MP LSP tree, the single replication branch representing a downstream path to only a second node of the plurality of nodes. In response to determining that the first node has only a single replication branch for the MP2MP LSP tree, sending a message to the second node indicating that the second node should refrain from sending upstream traffic towards the first node, and in response to determining that the first node does not have only a single replication branch for the MP2MP LSP tree, refraining from sending a message to the second node indicating that the second node should refrain from sending upstream traffic of the MP2MP LSP tree towards the first node.

20 Claims, 4 Drawing Sheets

(56) References Cited

U.S. PATENT DOCUMENTS

| | | |
|---|---|---|
| 7,039,687 B1 | 5/2006 | Jamieson et al. |
| 7,630,322 B2 | 12/2009 | Mohr |
| 7,724,732 B2 | 5/2010 | Guichard et al. |
| 7,808,993 B2 | 10/2010 | Zwiebel et al. |
| 2004/0205239 A1 | 10/2004 | Doshi et al. |
| 2005/0027782 A1 | 2/2005 | Jalan et al. |
| 2006/0002370 A1 | 1/2006 | Rabie et al. |
| 2006/0002408 A1 | 1/2006 | Ould-Brahim |
| 2006/0198321 A1 | 9/2006 | Nadeau et al. |
| 2006/0221867 A1 | 10/2006 | Wijnands et al. |
| 2006/0221950 A1 | 10/2006 | Heer |
| 2006/0221958 A1 | 10/2006 | Wijnands et al. |
| 2007/0091827 A1 | 4/2007 | Boers et al. |
| 2007/0104194 A1 | 5/2007 | Wijnands et al. |
| 2007/0140107 A1 | 6/2007 | Eckert et al. |
| 2007/0174483 A1 | 7/2007 | Raj et al. |
| 2007/0177525 A1 | 8/2007 | Wijnands et al. |
| 2007/0177527 A1 | 8/2007 | Bragg et al. |
| 2007/0217420 A1 | 9/2007 | Raj et al. |
| 2007/0253416 A1 | 11/2007 | Raj |
| 2007/0280276 A1 | 12/2007 | Sadler et al. |
| 2008/0080507 A1 | 4/2008 | Swallow et al. |
| 2008/0123650 A1 | 5/2008 | Bhaskar |
| 2008/0159311 A1 | 7/2008 | Martinotti et al. |
| 2008/0253367 A1 | 10/2008 | Ould-Brahim |

OTHER PUBLICATIONS

Minei et al., Label Distribution Protocol Extensions for P2MP and MP2MP Label Switched Paths, Jun. 2006, IETF, pp. 1-23.
Boers et al., "Creating Multipoint-to-Multipoint MPLS Trees in an Inter-Domain Environment," U.S. Appl. No. 11/960,187, filed Dec. 19, 2007.
Minei et al., "Label Distribution Protocol Extensions for Point-to-Multipoint and Multipoint-to-Multipoint Label Switched Paths draft-ietf-mpls-idp-p2mp-03," The IETF Trust, N.

US 9,369,297 B2

PREVENTING TRAFFIC FLOODING TO THE ROOT OF A MULTI-POINT TO MULTI-POINT LABEL-SWITCHED PATH TREE WITH NO RECEIVERS

CROSS REFERENCE TO RELATED APPLICATIONS

This Application claims priority to U.S. patent application Ser. No. 12/108,197, filed Apr. 23, 2008, entitled "PREVENTING TRAFFIC FLOODING TO THE ROOT OF A MULTI-POINT TO MULTI-POINT LABEL-SWITCHED PATH TREE WITH NO RECEIVERS," the contents of which is hereby incorporated herein by reference in its entirety for all purposes.

TECHNICAL FIELD

The present disclosure relates generally to the field of computer networking, and more particularly to multicast communications.

BACKGROUND

A Multi-Point to Multi-Point (MP2MP) Multi-Protocol Label Switching (MPLS) tree is a set of network nodes (e.g., computers, routers, hubs, switches), with one root node, and one or more child nodes connected either directly or indirectly to the root node. Every child node is either directly connected to the root node or to at least one other child node to enable communications with the root node. MPLS Label-Switched Paths (LSPs) are set up to allow messages to be multicast to all nodes of the MP2MP MPLS (or MP2MP LSP) tree. In such a tree, MPLS routers within a network replicate multicast transmissions based on a set of LSPs through the network. Each MPLS router sends multicast transmissions up the tree towards a root node as well as down the tree to nodes downstream from the router. Each MP2MP MPLS tree has one root node and one or more leaf nodes (or leaves), with optional transit nodes in between. MP2MP MPLS trees are utilized in order to allow leaf nodes to communicate bi-directionally with each other, and particularly to allow each leaf node to send multicast communications to all other nodes in the tree with minimal replication of the multicast messages.

BRIEF DESCRIPTION OF THE DRAWINGS

Objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

In one example embodiment, a method is provided for pruning an MP2MP LSP tree. The method includes determining, in a node of an MP2MP LSP tree that the node has only a single replication branch for the MP2MP LSP tree. That means that the node only has label mappings for one other node as a part of the MP2MP LSP tree. The single replication branch represents a downstream path to that other node and to no other nodes of the tree. In response to determining that the node has only a single replication branch, the node sends a message to the other node indicating that the other node should refrain from sending upstream traffic towards the node. Example apparatus are also provided for use in practicing certain embodiments. Embodiments allow MP2MP LSP trees to operate with reduced network traffic. Embodiments also reduce the load on certain routers.

DESCRIPTION OF EXAMPLE EMBODIMENTS

Figure 1:
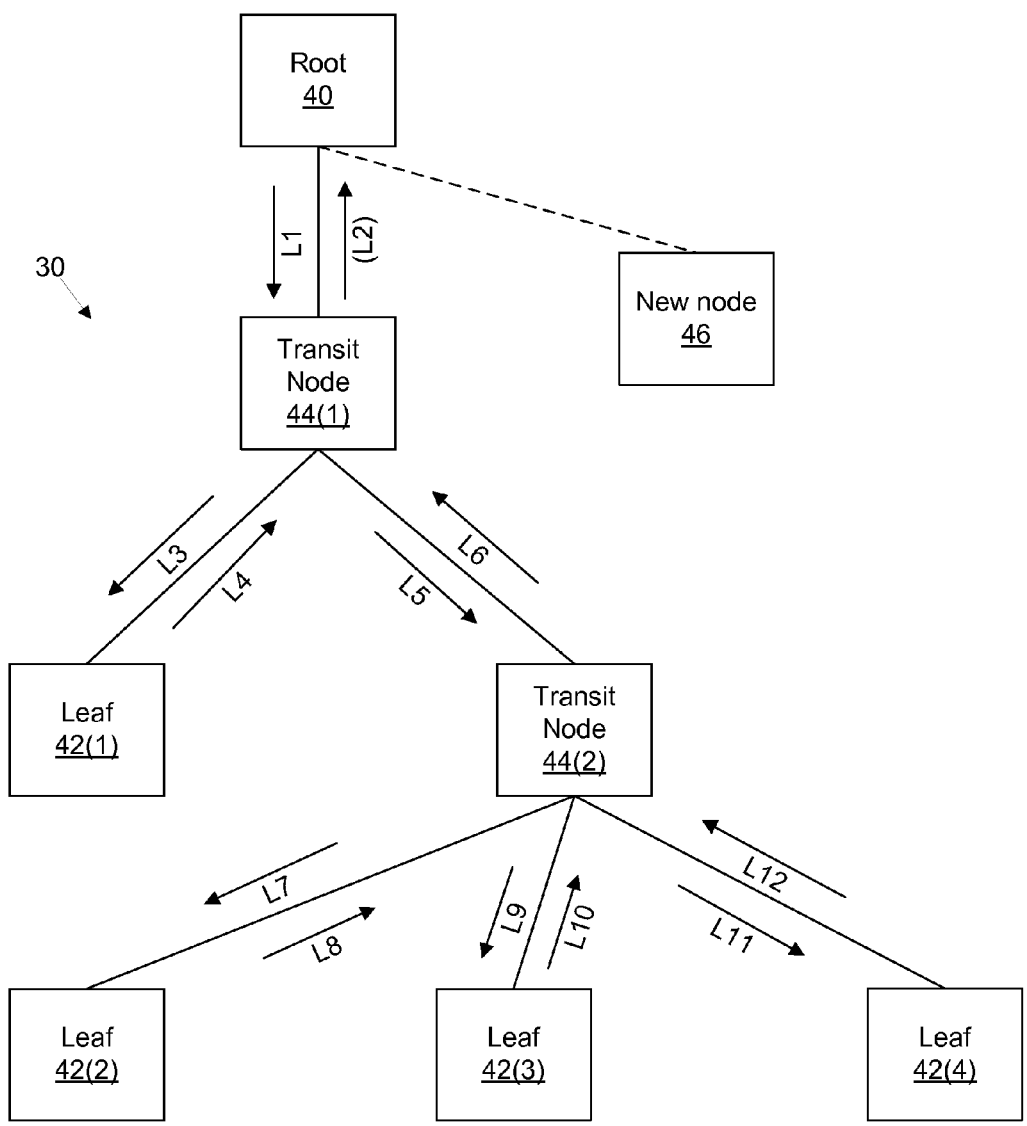
FIG. 1 illustrates an example system for use in practicing one embodiment.

FIG. 1 depicts an example MP2MP LSP tree 30 for use in practicing one embodiment. The tree 30 is made up of a plurality of nodes 40, 42, 44. One of the nodes is a root node 40. The root node 40 is, for example, a label-switched router (LSR). Other nodes are leaf nodes 42(1), 42(2), 42(3), 42(4) (generally leaf nodes 42). Between some of the leaf nodes 42 and the root node 40 are transit nodes 44(1), 44(2) (generally transit nodes 44). Transit nodes 44 are, for example, LSRs. The tree 30, for example, uses MPLS networking.

Various labels L1-L12 are used for communicating between the nodes of the tree 30. For example, in order for leaf 42(2) to send a multicast message to the remainder of the tree 30, leaf 42(2) sends a packet with a header containing label L8 to transit node 44(2). Transit node 44(2), upon receiving that packet, replicates the packet and forwards it on towards leaves 42(3) and 42(4) as well as to transit node 44(1), using labels L9, L11, and L6, respectively. Transit node 44(1), upon receiving that packet, replicates the packet and forwards it on towards leaf 42(1) with label L3. In conventional trees, transit node 44(1) would also forward the packet towards root node 40 with label L2 (as indicated by the parentheses).

However, in the example tree 30 depicted in FIG. 1, root node 30 has no actual need to receive the message because every leaf 42 should receive a copy of the message without need for the message to pass through the root 40. This is because root 40 has only a single replication branch. A replication branch is a connection to another node of the tree 30 over which a particular node is supposed to forward communications for that tree. In this case, root 40 has only one replication branch, represented by label L1.

Figure 2:
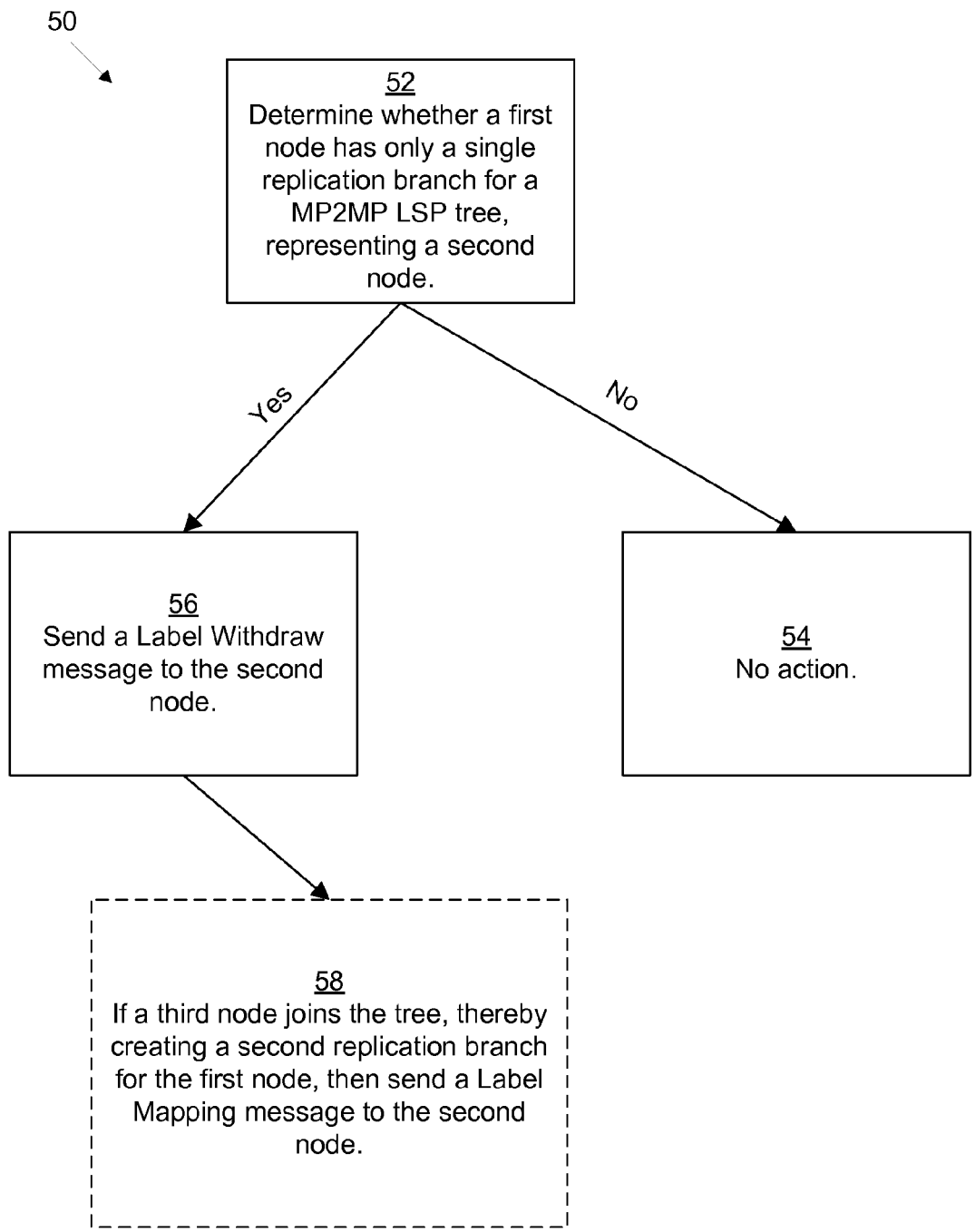
FIG. 2 illustrates an example method performed by one embodiment.

The root 40 performs the method 50 depicted in FIG. 2. In step 52, the root 40 determines whether it has only one replication branch (in this case represented by label L1 towards transit node 44(1)). If the root has more than one replication branch then no further action is taken (step 54). In step 56, the root, in response to determining that it has only one replication branch, sends a Label Withdraw message towards transit node 44(1). This Label Withdraw message is an LDP message indicating that transit node 44(1) should withdraw paths using label L2 towards the root node 40 from its Forwarding Information Base (FIB), which stores label mappings for that node.

Thus, in the future, all messages sent to transit node 44(1) for tree 30 will no longer be forwarded towards the root node 40. However, if, subsequently, a new node 46 joins the tree 30, by connecting directly to the root node 40, then messages will need to be sent through the root node again because the root node 40 now has two replication branches. Thus, in step 58, upon the new node 46 joining the tree, the root node 40 determines that it now has two replication branches, and it sends a Label Mapping message to transit node 44(1) indicating that messages for the tree 30 should henceforth resume being sent to the root (using label L2).

In one embodiment, the method 50 is performed upon a node sending a Label Withdraw message towards the root node 40. This could happen, for example, if a node connected to the root node 40 withdraws from the tree 30.

The method 50 may also be performed by a transit node 44. It should be noted that when a transit node 44 performs method 50, the transit node may receive a Label Withdraw message to trigger step 52 not only when a node withdraws from the tree 30, but also when an upstream node (such as the root node 40 or another transit node 44 located between the root node and the transit node 44 performing the method) sends it a Label Withdraw message due to performance by the upstream node of step 56.

Thus, suppose the root node 40 performs method 50 and thereby causes transit node 44(1) to remove paths with label L2 from its FIB. The Label Withdraw triggers method 50 in transit node 44(1). At that point, transit node 44(1) still has two replication branches (represented by labels L3 and L5), so step 52 has a negative result, leading to no further action being taken (step 54).

However, suppose leaf 42(1) withdraws from the tree 30 (for whatever reason, for example, system shutdown, logical changes to the network structure, etc.). Upon leaf 42(1) withdrawing from the tree 30, method 50 is again triggered in transit node 44(1). Since transit node 44(1) now has only a single replication branch (represented by label L5), step 53 now has a positive result, leading to step 56. In step 56 transit node 44(1) sends a Label Withdraw message to transit node 44(2). Thus, transit node 44(2) removes all paths in tree 30 having label L6 towards transit node 44(1). If leaf 42(1) were to reconnect to the tree 30 via transit node 44(1), then transit node 44(1) would perform step 58 and send a Label Mapping message to transit node 44(2) with label L6.

Figure 3:
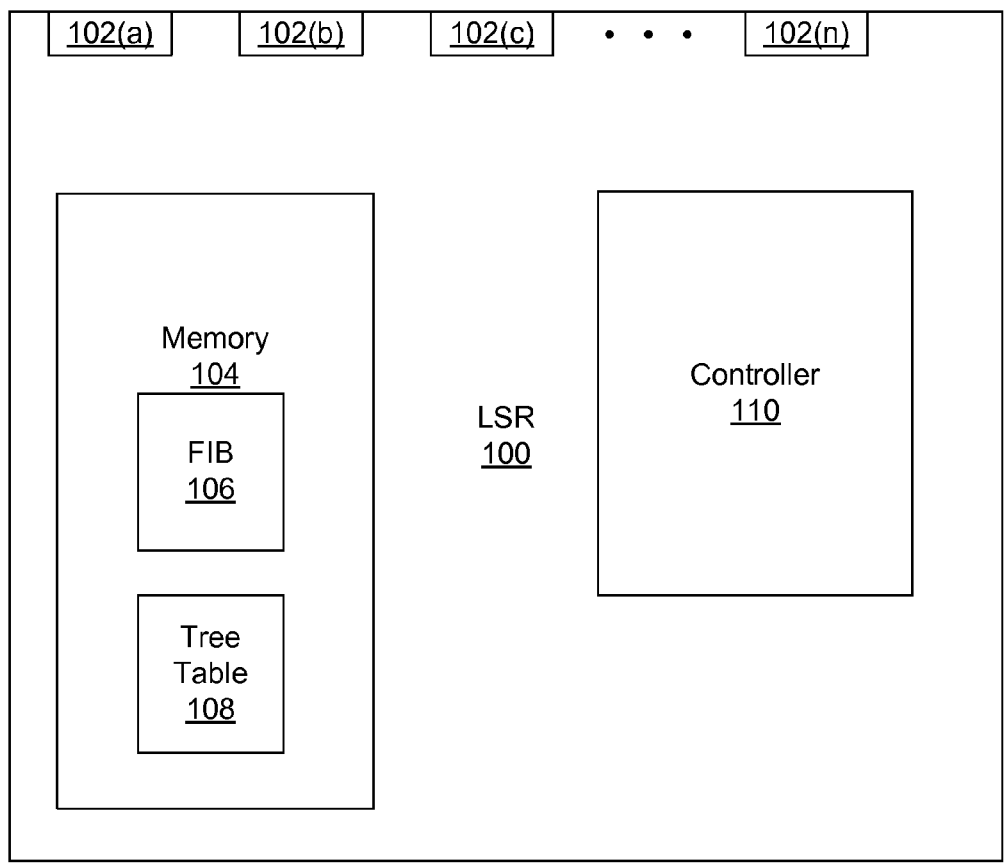
FIG. 3 illustrates an example apparatus of one embodiment.

FIG. 3 depicts an example LSR 100 for use in practicing various embodiments. Each root 40 and transit node 44 is typically a LSR 100. In some embodiments, each leaf node 42 is also an LSR 100. The LSR 100 contains a plurality of network interface ports 102(*a*), 102(*b*), . . . , 102(*n*) (generally network interfaces 102). One network interface, for example 102(*a*), may connect to an upstream node (in the case of transit nodes 44 and leaf nodes 42, but not root node 40), while other network interfaces, for example 102(*b*) and 102 (*c*) may connect to downstream nodes (in the case of transit nodes 44 and root node 40, but not leaf nodes 42). The LSR 100 also contains memory 104, which stores the FIB 106 for the node as well as a tree table 108 for storing additional data about the tree topology, and a controller 110, which performs methods as described above and below. It should be understood that controller 110 may be a microprocessor programmed to execute software. In such a case, software to cause the controller to perform method 50 (or other embodiments) may be stored in memory for the controller to load and execute. Alternatively, controller 110 may be special-purpose hardware configured to perform method 50 (or other embodiments) directly.

Figure 4:
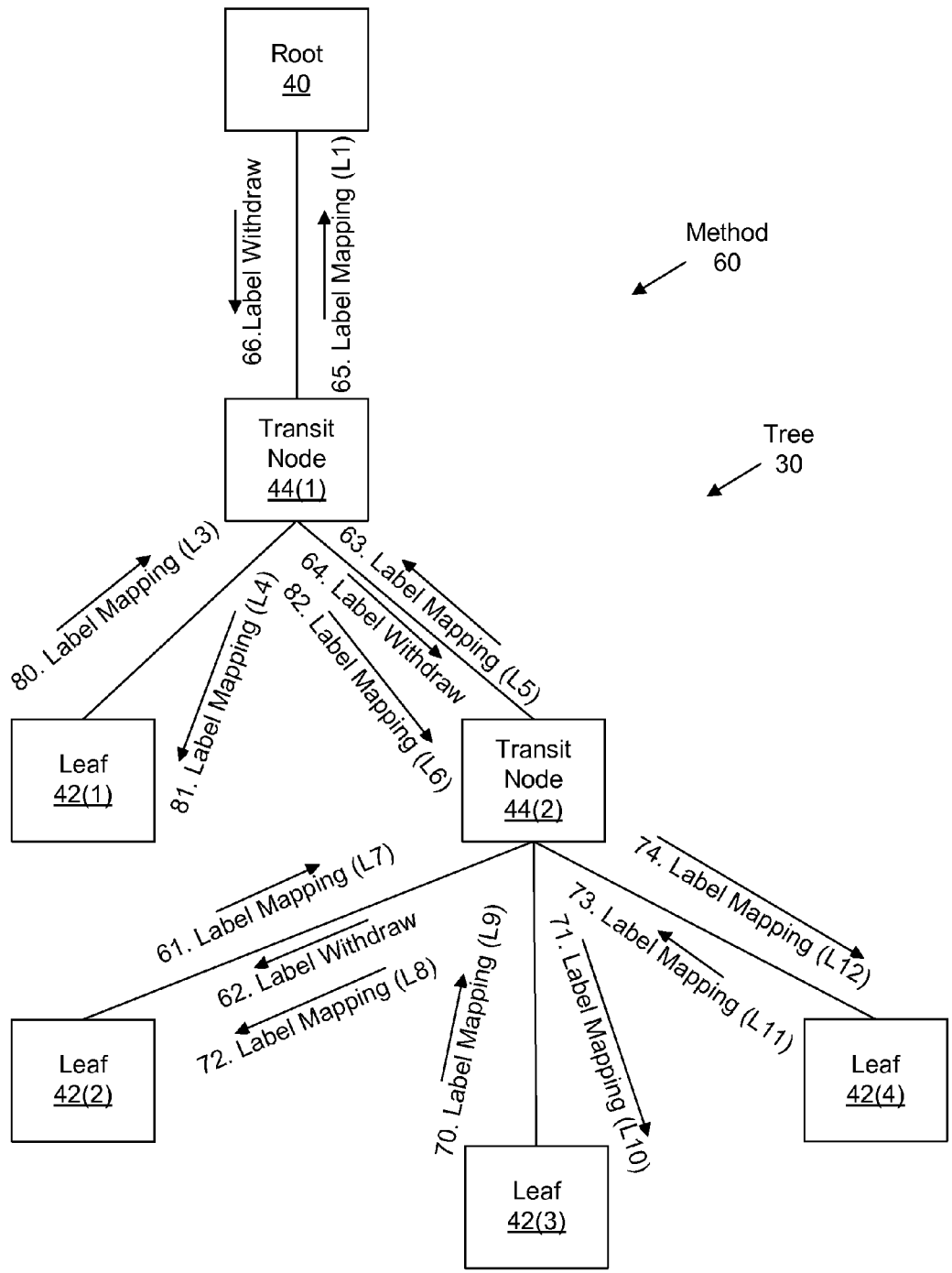
FIG. 4 illustrates an example method performed by one embodiment.

The method 50 may also be performed while setting up the tree 30 initially. For example, in FIG. 4, the construction of tree 30 is depicted in example method 60. The steps of method 60 are depicted in FIG. 4 as numbers preceding messages sent between the nodes. Assume that leaf 42(2) is the first node to join the tree. When leaf 42(2) begins to join the tree 30, leaf 42(2) allocates a label L7 and sends a Label Mapping packet upstream towards transit node 44(2) (transit node 44(2) connecting to leaf 42(2), for example, over interface 102(*b*) of transit node 44(2)), which is along the best path towards the root node 40 (step 61). Upon receiving the label mapping from leaf 42(2), because transit node 44(2) has no other replication branches yet, transit node 44(2) sends a Label Withdraw packet back to leaf 42(2) (step 62), and stores a reference to leaf 42(2) as a downstream node connected over interface 102(*b*) with downstream label L7 in its tree table 108. Note that although transit node 44(2) is sending a Label Withdraw packet to leaf 42(2), leaf 44(2) did not yet have an upstream label assigned to communications towards transit node 44(2)—the Label Withdraw packet in this case merely serves to alert leaf 42(2) that it should not expect a Label Mapping in response. Also, because leaf 42(2) was the first node to join the tree, transit node 44(2) does not yet have an upstream forwarding state, so transit node 44(2) also allocates a label L5 and sends a label mapping packet upstream (for example over its interface 102(*a*)) towards transit node 44(1), which is further along the best path towards the root node (step 63).

Upon receiving the label mapping from transit node 44(2) (transit node 44(1) connecting to transit node 44(2), for example, over interface 102(*b*) of transit node 44(1)), because transit node 44(1) has no other replication branches yet, transit node 44(1) sends a Label Withdraw packet back to transit node 44(2) (step 64), and stores a reference to transit node 44(2) as a downstream node connected over interface 102(*b*) with downstream label L5 in its tree table 108. Also, again, because transit node 44(2) was the first node to join the tree at transit node 44(1), transit node 44(1) does not yet have an upstream forwarding state, so transit node 44(1) also allocates a label L1 and sends a label mapping packet upstream (for example over its interface 102(*a*)) towards root node 40 (step 65).

Upon receiving the label mapping from transit node 44(1) (root 40 connecting to transit node 44(1), for example, over interface 102(*b*) of root 40), because root node 40 has no other replication branches yet, root node 40 sends a Label Withdraw packet back to transit node 44(1) (step 66), and stores a reference to transit node 44(1) as a downstream node connected over interface 102(*b*) with downstream label L1 in its tree table 108.

Subsequently, assume leaf 42(3) is the next node to join the tree. When leaf 42(3) begins to join the tree 30, leaf 42(3) allocates a label L9 and sends a Label Mapping packet upstream towards transit node 44(2) (transit node 44(2) connecting to leaf 42(3), for example, over interface 102(*c*) of transit node 44(2)), which is along the best path towards the root node 40 (step 70). Upon receiving the label mapping from leaf 42(3), transit node 44(2) now has two replication branches for the tree 30. Thus, transit node 44(2) allocates a label L10 and sends that label downstream to leaf 42(3) in a Label Mapping packet (step 71) for leaf 42(3) to use in upstream communication, and also allocates a label L8 and sends that label downstream to leaf 42(2) (which it locates by referencing its tree table 108) in a Label Mapping packet (step 72) for leaf 42(2) to use in upstream communication. At this point, the FIB 106 of transit node 44(2) is updated to reflect the MPLS paths that now exist: packets arriving from leaf 42(2) (i.e., over interface 102(*b*)) with label L8 are to be forwarded to leaf 42(3) (i.e., over interface 102(*c*)) with label L9, and packets arriving from leaf 42(3) (i.e., over interface 102(*c*)) with label L10 are to be forwarded to leaf 42(2) (i.e., over interface 102(*b*)) with label L7.

Similarly, if leaf 42(4) is the next node to join the tree, then leaf 42(4) allocates a label L11 and sends a Label Mapping packet upstream towards transit node 44(2) (transit node 44(2) connecting to leaf 42(4), for example, over interface 102(*d*) of transit node 44(2)), which is along the best path towards the root node 40 (step 73). Then transit node 44(2) allocates a label L12 and sends that label downstream to leaf 42(4) in a Label Mapping packet (step 74) for leaf 42(4) to use in upstream communication. At this point, the FIB 106 of transit node 44(2) is updated to reflect the additional MPLS paths that now exist: packets arriving from leaf 42(2) (i.e., over interface 102(*b*)) with label L8 are to be forwarded to leaf 42(4) (i.e., over interface 102(*d*)) with label L11, packets arriving from leaf 42(3) (i.e., over interface 102(*c*)) with label L10 are to be forwarded to leaf 42(4) (i.e., over interface 102(*d*)) with label L11, and packets arriving from leaf 42(4) (i.e., over interface 102(*d*)) with label L12 are to be forwarded to leaves 42(2) (i.e., over interface 102(*b*)) and 42(3) (i.e., over interface 102(*c*)) with labels L7 and L9 respectively.

Subsequently, assume leaf 42(1) is the next node to join the tree. When leaf 42(1) begins to join the tree 30, leaf 42(1) allocates a label L3 and sends a Label Mapping packet upstream towards transit node 44(1) (transit node 44(1) connecting to leaf 42(1), for example, over interface 102(*c*) of transit node 44(1)), which is along the best path towards the root node 40 (step 80). Upon receiving the label mapping from leaf 42(1), transit node 44(1) now has two replication branches for the tree 30. Thus transit node 44(1) allocates a label L4 and sends that label downstream to leaf 42(1) in a Label Mapping packet (step 81) for leaf 42(1) to use in upstream communication, and also allocates a label L6 and sends that label downstream to transit node 44(2) (which it locates by referencing its tree table 108) in a Label Mapping packet (step 82) for transit node 44(2) to use in upstream communication. At this point, the FIB 106 of transit node 44(1) is updated to reflect the MPLS paths that now exist: packets arriving from leaf 42(1) (i.e., over interface 102(*c*)) with label L4 are to be forwarded to transit node 44(2) (i.e., over interface 102(*b*)) with label L5, and packets arriving from transit node 44(2) (i.e., over interface 102(*b*)) with label L6 are to be forwarded to leaf 42(1) (i.e., over interface 102(*c*)) with label L3. Also, because transit node 44(2) has now received an upstream path, the FIB 106 of transit node 44(2) is updated to reflect the additional MPLS paths that now exist: packets arriving from leaves 42(2) (i.e., over interface 102(*b*)), 42(3) (i.e., over interface 102(*c*)), or 42(4) (i.e., over interface 102(*d*)) with labels L8, L10, or L12 respectively are to be forwarded upstream to transit node 44(1) (i.e., over interface 102(*a*)) with label L6; and packets arriving from transit node 44(1) (i.e., over interface 102(*a*)) with label L5 are to be forwarded downstream to leaves 42(2) (i.e., over interface 102(*b*)), 42(3) (i.e., over interface 102(*c*)), and 42(4) (i.e., over interface 102(*c*)) with labels L7, L9, and L11 respectively.

Method 60 has been described as assigning upstream labels to downstream nodes (or responding with Label Withdraws) as soon as an upstream node receives a downstream label from the downstream node. However, in some embodiments, upstream nodes may first send downstream labels towards the root and wait until an upstream label is received from upstream before an upstream label (or, as the case may be, a Label Withdraw) is sent towards the downstream node. Thus, for example, step 63 could follow step 61, and step 65 could follow step 63. Once step 66 is performed, 64 would then follow, followed by step 62. This approach would slightly increase the latency between the time a leaf node sends a Label Mapping packet and when it receives a response, but, the overall performance would likely improve somewhat because fewer Label Withdraws would be needed in certain situations (for example, if leaf 42(1) joined the tree before leaf 42(2) joined the tree, then transit node 44(2) would not need to send a Label Withdraw to leaf 42(2) but it could immediately send it a Label Mapping because transit node 44(2) would then already have another replication branch).

While various embodiments of the invention have been particularly shown and described, it will be understood by those skilled in the art that various changes in form and details may be made therein without departing from the spirit and scope of the invention as defined by the appended claims.

For example, embodiments have been described as using the MPLS and LDP protocols. However, other embodiments may utilize other label-switched protocols.

The invention claimed is:

1. A method comprising:
   at a first node of a multipoint-to-multipoint (MP2MP) label switched path (LSP) tree, the MP2MP LSP tree including a plurality of nodes, receiving, from a second node, a first Label Mapping packet, the second node being a first leaf node to join the MP2MP LSP tree;
   determining whether the first node has only a single replication branch for the MP2MP LSP tree;
   in response to determining that the first node has only the single replication branch for the MP2MP LSP tree, sending, by the first node, a first Label Withdraw packet to the second node;
   sending, by the first node, a second Label Mapping Packet upstream towards a third node;
   in response to the third node determining that it has only a single replication branch for the MP2MP LSP tree, receiving, from the third node, a second Label Withdraw packet;
   in response to subsequent downstream nodes joining the MP2MP LSP tree, receiving subsequent Label Mapping Packets from each of the subsequent downstream nodes resulting in the first node having more than one replication branch;
   in response to receiving the subsequent Label Mapping Packets, sending additional Label Mapping Packets to each of the subsequent downstream nodes; and
   updating a Forwarding Information Base (FIB) of the first node to reflect all paths that exist due to addition of the first node and the subsequent downstream nodes to the MP2MP LSP tree.

2. The method of claim 1, further comprising sending, by the first node, a third Label Mapping Packet to the second node for use by the second node in upstream communications.

3. The method of claim 1, wherein, the first node sends the second Label Mapping Packet upstream towards the third node before the first node sends the first Label Withdraw Packet to the second node.

4. The method of claim 1, wherein the first node sends the first Label Withdraw Packet to the second node after receiving the second Label Withdraw Packet from the third node.

5. The method of claim 2, further comprising accessing a tree table to determine a location of the second node before sending the third Label Mapping Packet to the second node for use by the second node in upstream communications.

6. The method of claim 1, wherein subsequent to sending the first Label Withdraw packet to the second node, further comprising storing a reference to the second node as a downstream node in a tree table of the first node.

7. The method of claim 1, wherein determining the first node has only the single replication branch for the MP2MP LSP tree is performed in response to receiving, at the first node, a request for label mapping.

8. A first node comprising:
a plurality of network interfaces; and
a controller, the controller configured to:
receive from a second node connected to a first one of the plurality of network interfaces, a first Label Mapping packet, the second node being a first leaf node to join a multipoint-to-multipoint (MP2MP) label switched path (LSP) tree;
determine whether the first node has only a single replication branch for the MP2MP LSP tree;
in response to determining that the first node has only the single replication branch for the MP2MP LSP tree, send a first Label Withdraw packet to the second node via the first one of the plurality of network interfaces;
send a second Label Mapping Packet upstream towards a third node connected to a second one of the plurality of network interfaces;
in response to the third node determining that it has only a single replication branch for the MP2MP LSP tree, receive, from the third node, a second Label Withdraw packet;
in response to subsequent downstream nodes joining the MP2MP LSP tree, receive over the plurality of network interfaces subsequent Label Mapping Packets from each of the subsequent downstream nodes resulting in the first node having more than one replication branch;
in response to receiving the subsequent Label Mapping Packets, send additional Label Mapping Packets to each of the subsequent downstream nodes over the plurality of network interfaces; and
update a Forwarding Information Base (FIB) of the first node to reflect all paths that exist due to addition of the first node and the subsequent downstream nodes to the MP2MP LSP tree.

9. The first node of claim 8, the controller further configured to send a third Label Mapping Packet to the second node for use by the second node in upstream communications.

10. The first node of claim 8, the controller further configured to send the second Label Mapping Packet upstream towards the third node before the first node sends the first Label Withdraw Packet to the second node.

11. The first node of claim 8, the controller further configured to send the first Label Withdraw Packet to the second node after receiving the second Label Withdraw Packet from the third node.

12. The first node of claim 9, the controller further configured to access a tree table to determine a location of the second node before sending the third Label Mapping Packet to the second node for use by the second node in upstream communications.

13. The first node of claim 8, wherein subsequent to sending the first Label Withdraw packet to the second node, the controller is further configured to store a reference to the second node as a downstream node in a tree table.

14. The first node of claim 8, wherein determining the first node has only the single replication branch for the MP2MP LSP tree is performed in response to the first node receiving a request for label mapping.

15. A non-transitory computer-readable storage medium having a computer readable program code embodied therein, the computer-readable program code when executed by at least one processor causes the at least one processor within a first node to:
receive from a second node, a first Label Mapping packet, the second node being a first leaf node to join a multipoint-to-multipoint (MP2MP) label switched path (LSP) tree;
determine whether the first node has only a single replication branch for the MP2MP LSP tree;
in response to determining that the first node has only the single replication branch for the MP2MP LSP tree, send a first Label Withdraw packet to the second node;
send a second Label Mapping Packet upstream towards a third node;
in response to the third node determining that it has only a single replication branch for the MP2MP LSP tree, receive, from the third node, a second Label Withdraw packet;
in response to subsequent downstream nodes joining the MP2MP LSP tree, receive subsequent Label Mapping Packets from each of the subsequent downstream nodes resulting in the first node having more than one replication branch;
in response to receiving the subsequent Label Mapping Packets, send additional Label Mapping Packets to each of the subsequent downstream nodes; and
update a Forwarding Information Base (FIB) of the first node to reflect all paths that exist due to addition of the first node and the subsequent downstream nodes to the MP2MP LSP tree.

16. The non-transitory computer-readable storage medium of claim 15, when executed by the at least one processor, further causes the at least one processor to send a third Label Mapping Packet to the second node for use by the second node in upstream communications.

17. The non-transitory computer-readable storage medium of claim 15, when executed by the at least one processor, further causes the at least one processor to send the second Label Mapping Packet upstream towards the third node before the first node sends the first Label Withdraw Packet to the second node.

18. The non-transitory computer-readable storage medium of claim 15, when executed by the at least one processor, further causes the at least one processor to send the first Label Withdraw Packet to the second node after receiving the second Label Withdraw Packet from the third node.

19. The non-transitory computer-readable storage medium of claim 16, when executed by the at least one processor, further causes the at least one processor to access a tree table to determine a location of the second node before sending the third Label Mapping Packet to the second node for use by the second node in upstream communications.

20. The non-transitory computer-readable storage medium of claim 15, wherein subsequent to sending the first Label Withdraw packet to the second node, the at least one processor is further caused to store a reference to the second node as a downstream node in a tree table.

* * * * *